No. 689,668. Patented Dec. 24, 1901.
C. CIANGHEROTTI.
APPARATUS FOR MANUFACTURING WELDLESS METAL TUBES.
(Application filed June 26, 1900.)
(No Model.) 2 Sheets—Sheet 1.
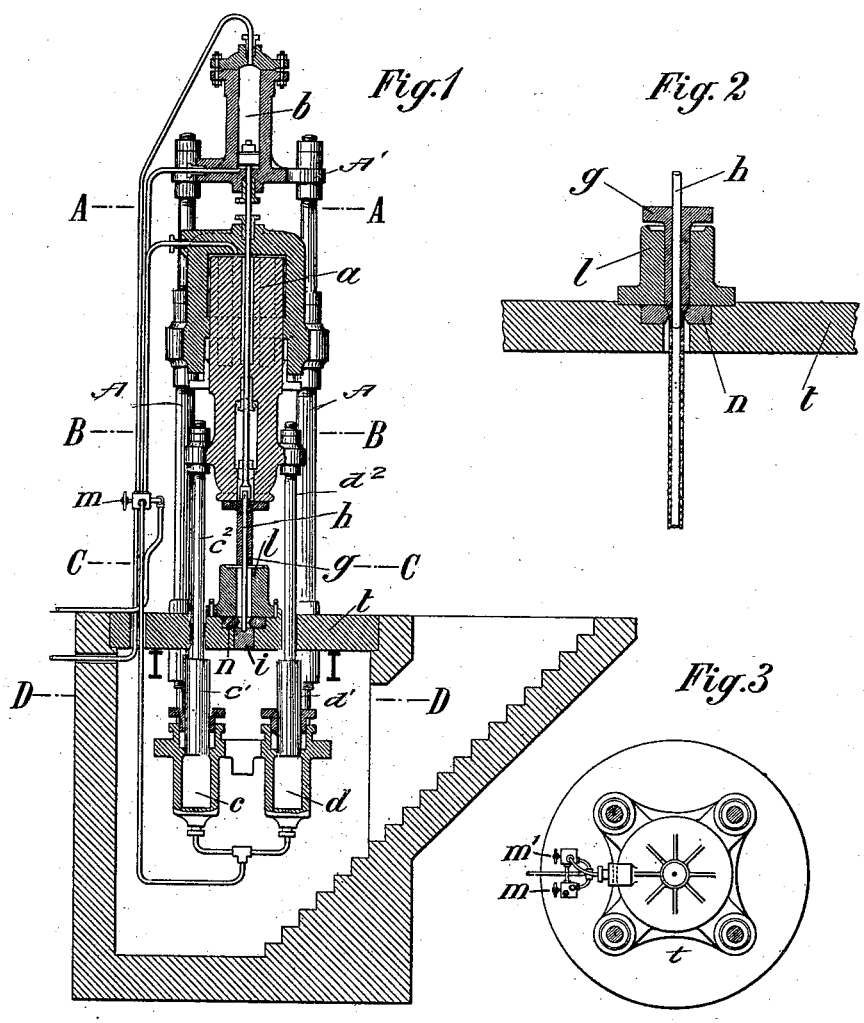

No. 689,668. Patented Dec. 24, 1901.
C. CIANGHEROTTI.
APPARATUS FOR MANUFACTURING WELDLESS METAL TUBES.
(Application filed June 26, 1900.)
(No Model.) 2 Sheets—Sheet 2.

UNITED STATES PATENT OFFICE.

CORRADO CIANGHEROTTI, OF GENOA, ITALY.

APPARATUS FOR MANUFACTURING WELDLESS METAL TUBES.

SPECIFICATION forming part of Letters Patent No. 689,668, dated December 24, 1901.

Application filed June 26, 1900. Serial No. 21,589. (No model.)

*To all whom it may concern:*

Be it known that I, CORRADO CIANGHEROTTI, gentleman, a subject of the King of Italy, residing at Genoa, in the Kingdom of Italy, have invented certain new and useful Improvements in or Relating to Apparatus for Manufacturing Weldless Metal Tubes, of which the following is a specification.

My present invention relates to the manufacture of weldless metal tubes, and has for its object an apparatus whereby such weldless tubes are made by submitting the metal while melted to a drawing action.

In order that my said invention may be more clearly understood, I will proceed to describe same with reference to the annexed drawings, in which—

Figure 4:
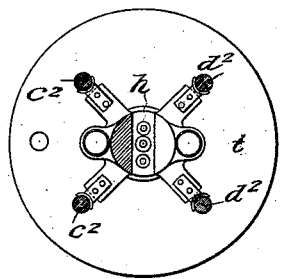
Figure 5:
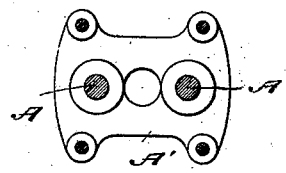
Figure 6:
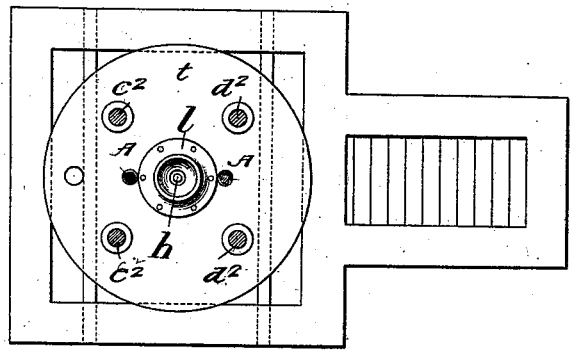

Figure 1 is a sectional elevation of the apparatus. Fig. 2 is a vertical section of the mandrel and ingot-mold after a tube has been drawn. Figs. 3, 4, 5, and 6 are cross-sections on lines A A, B B, C C, and D D, respectively, of Fig. 1.

In the said figures, $a$ is the cylinder which receives the required pressure for lowering the piston $g$.

$b$ is the cylinder which receives the required pressure for raising and lowering the mandrel $h$.

$c$ and $d$ are two feeding-cylinders.

$g$ is the piston; $h$, the mandrel; $i$, the plug of the drawer; $l$, the ingot-mold; $m$ $m'$, the pressure-feeding cocks; $n$, the die; $t$, the supporting-platform.

$c'$ $d'$ are pistons in the cylinders $c$ $d$, as seen in Fig. 1, and the piston-rods $c^2$ $d^2$ of these pistons are guided through the platform $t$ and are connected to the cylinder $a$, as shown. The cylinder is connected with the rods A, the upper ends of which are connected to the top plate A'.

The apparatus mainly consists of the ingot-mold $l$, in the lower part of which is fitted a die $n$, carried by the platform $t$. The mandrel $h$ is arranged in the center of the ingot-mold to act as core for the metal under pressure during the drawing and the manufacture of the tube. The piston $g$, connected with cylinder $a$, may come down in the hollow part of the ingot-mold $l$ for compressing the melted metal.

By means of the feeding-cocks $m$ $m'$ the necessary power can be supplied inside the cylinders $a$ $b$ $c$ $d$, such power being taken from a hydraulic press, a steam-engine, an air-pump, or from any other suitable source. The power sent to cylinder $a$ serves for lowering the piston $g$ into the ingot-mold $l$ and the power sent to cylinder $b$ serves for raising and lowering the mandrel $h$ and also for taking it out altogether when necessary for clearing it, or replacing it, or for any other purpose. The power sent to cylinders $c$ and $d$ serves for again raising the piston $g$.

The operation of the apparatus is as follows: I pour into the ingot-mold $l$ the required quantity of melted metal, such ingot-mold being preferably heated, so as to maintain the mass of metal in an even melted condition. At this time the piston $g$ must be at the top, the mandrel $h$ at the bottom, and the plug $i$ in its position. As soon as the metal is poured into the previously-heated ingot-mold I open the feeding-cock for sending the pressure into the cylinder $a$. The piston $g$ then comes down and compresses the metal in the ingot-mold $l$, the plug $i$ of the drawer on account of the pressure falls down, and the metal is forced to pass in an annular form through the drawer $n$, around the mandrel $h$, and is discharged at the bottom of the drawer in the shape of a tube until the piston $g$ has reached the bottom of the ingot-mold $l$. The first part of the operation being thus completed, I open the other feeding-cock in order to send the pressure in the lower part of cylinder $b$, so as to raise the mandrel $h$. When it is completely raised, I remove the pressure from the cylinder $a$, and by means of the third feeding-cock I cause the pressure to pass into the cylinders $c$ and $d$ and in the upper part of cylinder $b$, thus lifting the piston $g$ and lowering the mandrel $h$. The plug is now replaced by the cooled metal at the bottom of the ingot-mold around the drawer. The apparatus is now ready for a second operation, and melted metal may again be poured into the ingot-mold and the operation continued as before.

I desire it to be clearly understood that many changes may be made in the construction and arrangements of the various parts without departing from the gist of my invention. Also the four cylinders $a$ $b$ $c$ $d$, as described, are not essential for the working of the apparatus, as they may be substituted by other mechanical equivalents for raising and lowering the parts g and h.

Having thus fully described my said invention and the manner in which the same is to be performed, I declare that what I claim, and desire to secure by Letters Patent, is—

1. In an apparatus for manufacturing weldless metal tubes by drawing the metal while melted, the combination of an ingot-mold, a die fitted in the lower part thereof, a mandrel in said mold acting as a core, means for raising and lowering the mandrel, a piston and independent means for raising and lowering the piston around the mandrel and a plug frictionally held in the bottom of the mold.

2. In an apparatus for manufacturing weldless metal tubes by drawing the metal while melted, the combination of an ingot-mold, a die fitted in the lower part thereof, a plug held in the mold below the die, a mandrel working in said mold and acting as a core, a piston through which the mandrel works, a compressed-air cylinder and connections for actuating the mandrel by the admission of a motive fluid, and independent connections for actuating the piston independently of the mandrel.

3. In an apparatus for manufacturing weldless metal tubes by drawing the metal while melted, the combination of a cylinder, means for admitting and controlling a motive fluid thereto, an ingot-mold, a die fitted in the lower part thereof, a plug frictionally held in said mold in the path of the mandrel, a piston movable in said mold, a mandrel movable in the piston, a cylinder and piston for actuating the mandrel, and cylinders and means for raising and lowering the first-mentioned piston independent of the mandrel.

In witness whereof I have hereunto set my signature in the presence of two witnesses.

CORRADO CIANGHEROTTI.

Witnesses:
RAY LUIGILECCHI,
ANGELO BORAZINO.